United States Patent
Khovaylo et al.

(10) Patent No.: US 6,791,724 B2
(45) Date of Patent: Sep. 14, 2004

(54) IMAGING DEVICE WITH MEDIA CLAMP

(75) Inventors: Modest Khovaylo, Ft Collins, CO (US); Jesse M Gerrard, Loveland, CO (US); Steven Vordenberg, New York, NY (US); Philipp Refior, Brooklyn, NY (US); Clay Burns, New York, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 651 days.

(21) Appl. No.: 09/873,877

(22) Filed: Jun. 4, 2001

(65) Prior Publication Data

US 2002/0181030 A1 Dec. 5, 2002

(51) Int. Cl.[7] .......................... H04N 1/04; G03G 15/00; G03G 15/04; G03B 42/02; G03B 42/04; H05G 1/02
(52) U.S. Cl. ...................... 358/497; 358/474; 358/494; 399/377; 399/379; 399/380; 399/211; 399/212; 378/177; 378/187; 378/188; 378/195
(58) Field of Search ................................. 358/474, 497, 358/494; 399/379, 380, 211, 212, 377; 378/177, 187, 188, 195

(56) References Cited

U.S. PATENT DOCUMENTS

| | | |
|---|---|---|
| 3,992,623 A | 11/1976 | Rhyins et al. |
| 4,321,620 A | 3/1982 | Shimooka et al. |
| 4,415,255 A | 11/1983 | Huber et al. |
| 4,633,080 A | 12/1986 | Wilman et al. |
| 4,926,041 A | 5/1990 | Boyd .......................... 250/226 |
| 4,933,753 A | 6/1990 | Watanabe |
| 5,072,252 A | 12/1991 | Howseman |
| 5,339,107 A | 8/1994 | Henry et al. ................ 348/270 |
| 5,410,347 A | 4/1995 | Steinle et al. ............... 348/270 |
| 5,416,570 A | 5/1995 | Kondou |
| 5,475,505 A | 12/1995 | Minasian et al. |
| 5,568,282 A | 10/1996 | Thomson et al. |
| 5,619,302 A | 4/1997 | Wu |
| 5,646,394 A | 7/1997 | Steinle et al. ............ 250/208.1 |
| 5,847,846 A | 12/1998 | Wu et al. |
| 5,956,158 A | 9/1999 | Pinzarrone et al. |
| 6,038,052 A | 3/2000 | Arnold et al. |
| 6,040,572 A | 3/2000 | Khovaylo et al. |
| 6,105,954 A | 8/2000 | Magee et al. |
| 6,172,360 B1 | 1/2001 | Khovaylo et al. |
| 6,208,437 B1 | 3/2001 | Neushul |
| 6,233,065 B1 * | 5/2001 | Lee ............................. 358/475 |
| 6,285,483 B1 * | 9/2001 | Shia et al. .................. 359/196 |
| 6,678,077 B1 * | 1/2004 | Huang ........................ 358/497 |

FOREIGN PATENT DOCUMENTS

| | | |
|---|---|---|
| EP | 0568080 A1 | 11/1993 |
| EP | 0917344 A1 | 5/1999 |
| JP | 61-260760 | 11/1986 |
| JP | 63-088955 | 4/1988 |
| JP | 01-144774 | 6/1989 |
| JP | 02-017759 | 1/1990 |
| JP | 04-149786 | 5/1992 |
| JP | 06-141144 | 5/1994 |
| WO | WO 95/02937 | 1/1995 |
| WO | WO 95/26607 | 10/1995 |
| WO | WO 97/26755 | 7/1997 |

OTHER PUBLICATIONS

U.S. patent application Ser. No. 09/016,562, filed Jan. 30, 1998 for Reflector for Document Scanner or Copier of Batten et al.
U.S. patent application Ser. No. 09/082,847, filed May 21, 1998 for Notebook Styled Scanner of Michael A. Puyot et al.
Declaration of David Hanson and attachment.

* cited by examiner

*Primary Examiner*—Edward Coles
*Assistant Examiner*—Houshang Safaipour (57) ABSTRACT

An imaging device comprising a transparent, media support platen having a first surface portion and a second surface portion; a media clamp mounted in displaceable, overlying relationship with the first surface portion of the platen; and a lid mounted in displaceable overlying relationship with the second surface portion of the platen.

19 Claims, 11 Drawing Sheets

IMAGING DEVICE WITH MEDIA CLAMP

FIELD OF THE INVENTION

The present invention relates generally to flat bed type imaging devices and, more particularly, to flatbed imaging devices having a media clamp assembly.

BACKGROUND OF THE INVENTION

Optical scanners create electronic data representative of a scanned object. Flatbed optical scanners are usually stationary devices which have a transparent, horizontally disposed, flat plate or platen upon which an object to be scanned, such as a document or photograph, may be placed. The document may be scanned by sequentially imaging narrow strips or scan line portions of the document on a linear optical sensor array such as a charged coupled device (CCD). In one type of flatbed scanner the current scan line portion of the document which is imaged on the sensor array is changed or "swept" by moving the platen supporting the document relative to the scanner imaging assembly.

In another, more popular, type of flatbed scanner the platen and document remain stationary and at least a portion of an imaging assembly is moved to change the scan line portion that is currently imaged. A flatbed optical scanner of the fixed platen type has a housing enclosing and shielding various optical and mechanical assemblies of the scanner. The scanner platen is mounted in an opening in a top portion of the housing. A carriage assembly, typically mounted on horizontal rails, is displaced below and parallel to the scanner platen. Fixed platen, flatbed scanners are disclosed in the following patents, each of which is hereby incorporated by reference for all that is disclosed therein: Boyd, U.S. Pat. No. 4,926,041; Henry et al., U.S. Pat. No. 5,339,107, Steinle et al., U.S. Pat. No. 5,410,347; and Steinle et al., U.S. Pat. No. 5,646,394.

In the absence of a mechanical feed device (automatic document feeder), most flatbed scanners are equipped with a cover or lid that is pivotally attached to the scanner housing so that it may be opened and closed like the cover of a book to expose or cover the platen. The lid is designed to cover the platen and any document placed on the platen during a scanning operation. Scanner lids are disclosed in U.S. patent application Ser. No. 09/016,562 of Batten et al., filed Jan. 30, 1998 for REFLECTOR FOR DOCUMENT SCANNER OR COPIER which is hereby incorporated by reference for all that it discloses.

A problem encountered in using flatbed scanners equipped with lids is that air movement is created by closing the lid on a document. The document, which has typically been placed at a desired location and orientation on the platen, is displaced as a result of the air movement. Often the displacement takes place during the very last stage of lid closing and thus goes unnoticed until after a scan has been made. Another related problem with document placement occurs because of static electricity which sometimes builds up on sheet media as a result of sliding against other sheets, etc. This static buildup can create a nearly friction-free interface between a sheet to be scanned and the scanner platen. As a result the sheet "slides around" on the platen in response to any bumps or jolts to furniture that supports the scanner or as a result of any deviation from a horizontal orientation of the platen, as well as "wind" caused by closing the lid.

A flatbed optical scanner is one type of imaging device that encounters the above-described problems. Similar problems exist for other flatbed-type imaging devices such as digital imaging devices that use two dimensional photodetector arrays (rather than the one dimensional arrays used by conventional scanners), photocopy machines (conventional and digital), etc. As used herein, the term "imaging device" includes optical scanners, digital imagers with two-dimensional sensors, photocopiers, and other similar devices.

SUMMARY OF THE INVENTION

The applicants perceive that a need exists for a method and apparatus to maintain a document at a fixed orientation on a scanner platen to prevent the displacements without interfering with the scanner lid or with the scanning operation.

The present invention is directed towards a scanner. The scanner may have a transparent, media support platen provided with a first surface portion and a second surface portion. The scanner may also have a media clamp mounted in displaceable, overlying relationship with the first surface portion of the platen. Additionally, the scanner may have a lid mounted in displaceable overlying relationship with the second surface portion of the platen.

The present invention is also a scanner provided with a transparent means for supporting an object to be imaged. The scanner may also have a means for clamping the object to the transparent means and for partially light blockingly covering the transparent means. Additionally, the scanner may have a means for light blockingly covering all portions of the transparent means not covered by the means for clamping.

The present invention is also a method of imaging at least one object by holding a first object against a platen with a clamp, and then covering a portion of the platen not covered by the clamp with a lid.

The present invention is also a method of imaging an object by biasingly urging a portion of the object against a first side of a platen and then illuminating the object from a second side of the platen opposite the first side.

DETAILED DESCRIPTION OF THE INVENTION

Figure 1:
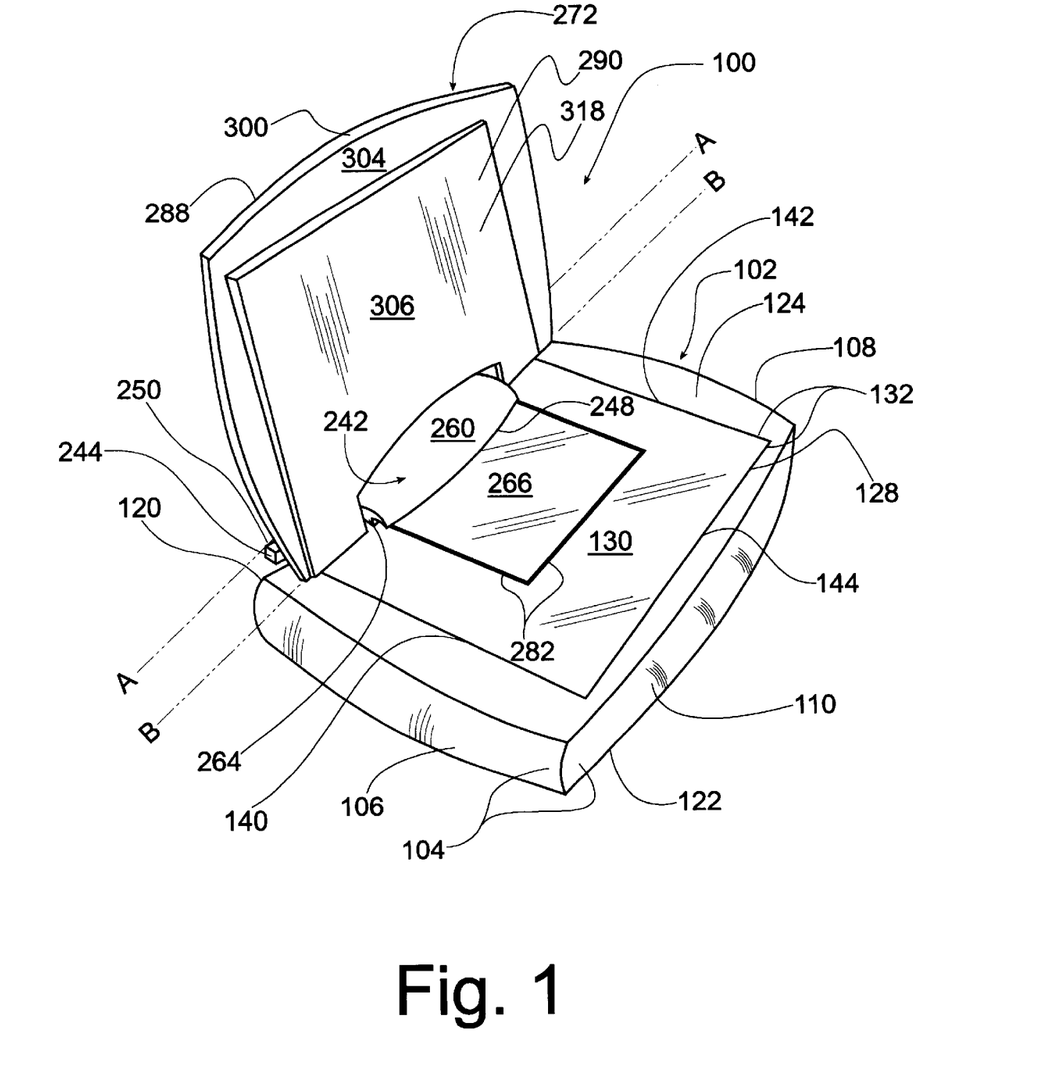
FIG. 1 is a perspective view of an imaging device in accordance with the present invention in a first operating condition.
Figure 2:
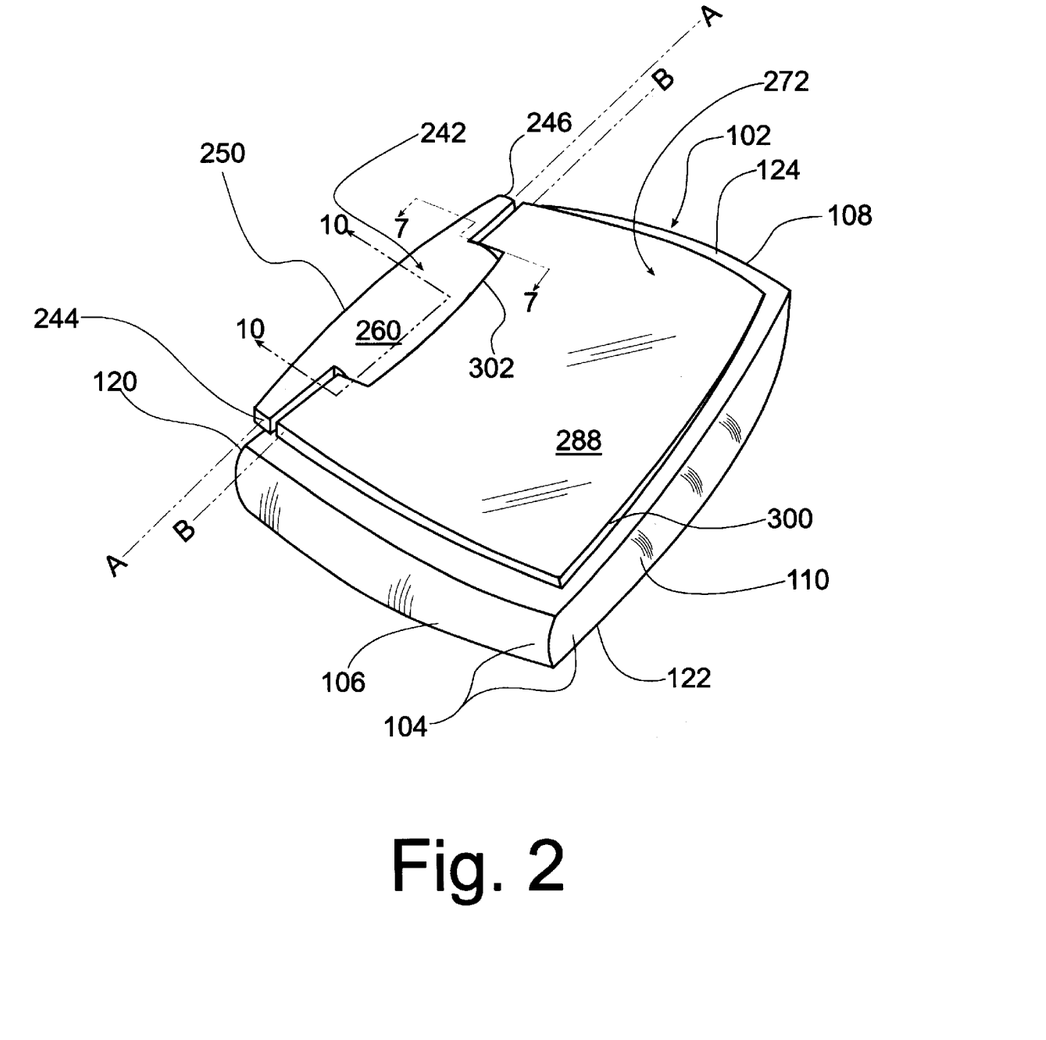
FIG. 2 is a perspective view of an imaging device in a second operating condition.
Figure 3:
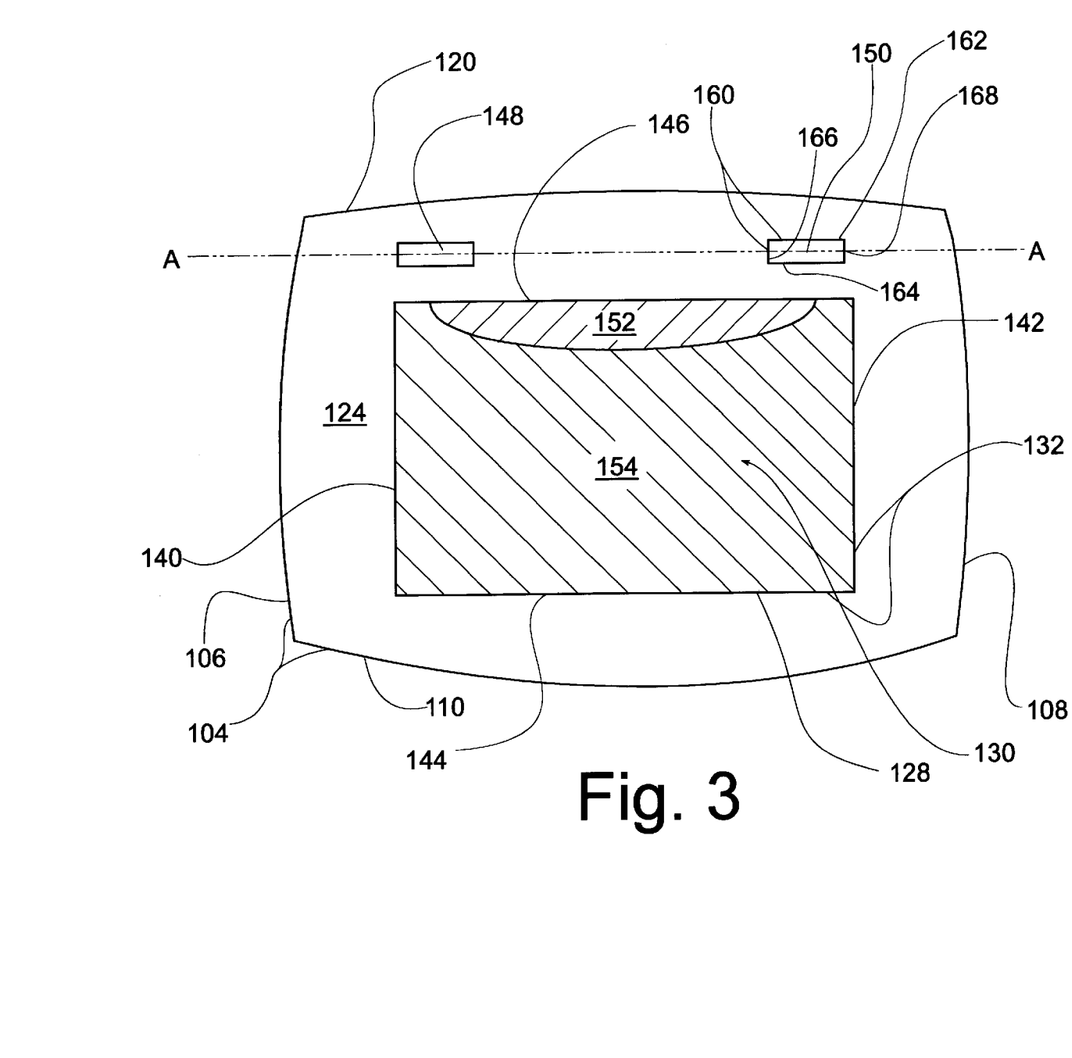
FIG. 3 is a top plan view of an imaging device with a clamp and lid assembly removed.

FIGS. 1–10, in general, illustrate an imaging device 100 provided with a transparent media support platen 130 having a first surface portion 152, FIG. 3, and an adjacent second surface portion 154, a media clamp 242, FIG. 1, mounted in displaceable, overlying relationship with the first surface portion 152 of the platen 130, and a lid 272 mounted in displaceable overlying relationship with the second surface portion 154 of the platen 130.

Having provided a brief overview, a more detailed description of an exemplary embodiment of an imaging device 100 will now be provided. Referring to FIG. 1, the imaging device 100 may be an optical scanner having a scanner housing 102 with a peripheral sidewall 104. The peripheral sidewall 104 may be provided with a left side portion 106, a right side portion 108, a front portion 110, and a back portion 120. The peripheral sidewall portion 104 may extend between a housing bottom portion 122 and a housing top portion 124. The housing peripheral sidewall portion 104, housing top portion 124, and housing bottom portion 122 define a housing cavity 126, FIG. 7. The housing top portion 124 has an opening 128 adapted to receive a transparent media support platen 130. The transparent media support platen 130 has a perimeter 132 defined by a left edge 140, a right edge 142, a front edge 144, and a back edge 146 (FIG. 3). Referring to FIG. 3, the transparent media support platen 130 may have a first surface portion 152 and a coplanar, adjacent second surface portion 154 located on the transparent media support platen 130. The first surface portion 152, in the exemplary embodiment as shown, begins near the back edge portion 146 of the transparent media support platen 130 and extends forwardly. In the exemplary embodiment, the first surface portion 152 may be less then ten square inches and is preferably less than eight square inches. It is to be appreciated that this exemplary dimension for the first surface portion 152 is a design alternative and the dimension could be more or less depending on the geometry of the media clamp 242.

Figure 7:
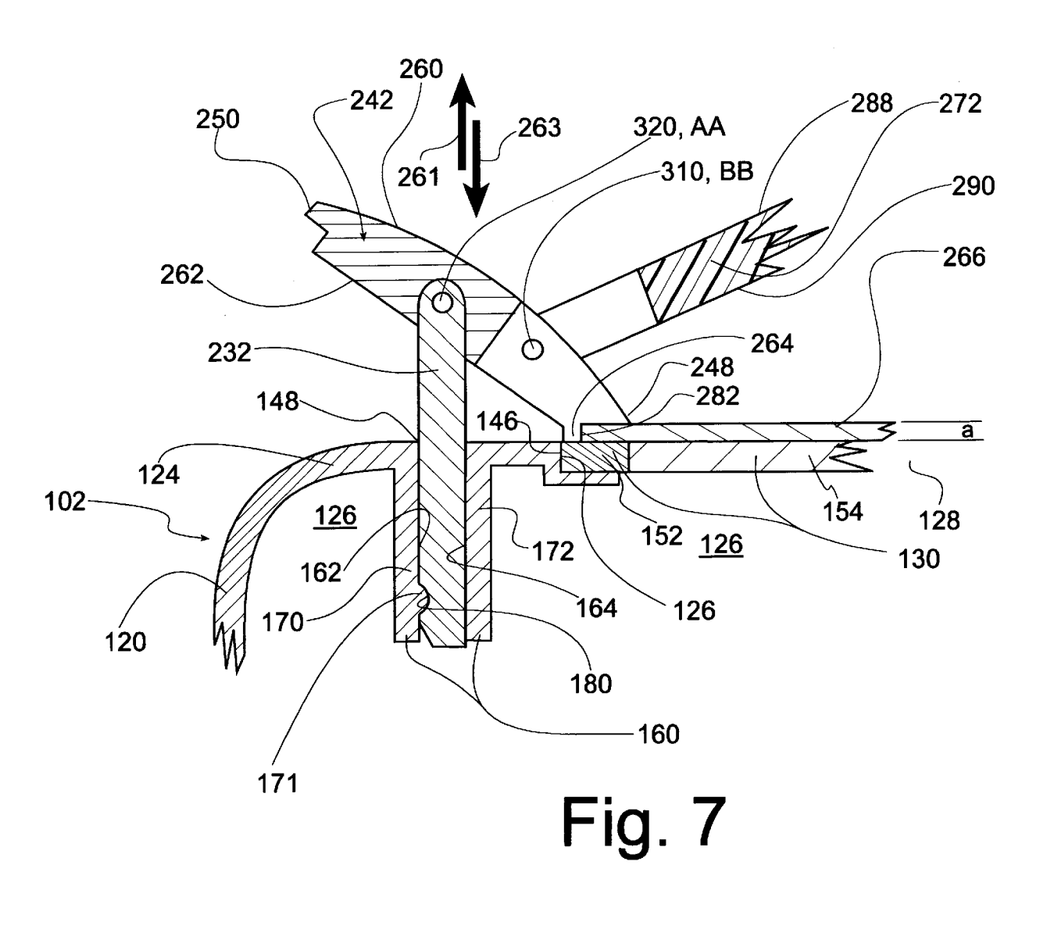
FIG. 7 is a detail, cross-sectional view of an attachment post assembly of an imaging device clamp and lid assembly

Referring to FIG. 3, a left post receiving cavity 148 and a right post receiving cavity 150 may be disposed on the housing top portion 124. The receiving cavities 148, 150 may be disposed in the area between the housing back portion 120 and the back edge 146 of the transparent media support platen 130. Each receiving cavity 148, 150 may have a perimeter wall surface 160 including a rear wall surface 162, a front wall surface 164 and side wall surfaces 166, 168. The rear wall surface 162 may be provided on a downwardly projecting, cantilevered latch member 170 (not shown in FIG. 3; as best shown in FIG. 7). The wall surfaces 164, 166, 168 may be provided on a relatively rigid three-sided, box-shaped member shown partially in FIG. 7. The cantilevered latch member 170 may have a protrusion 171 for readily removably engaging a detent 180 as discussed later.

Figure 6:
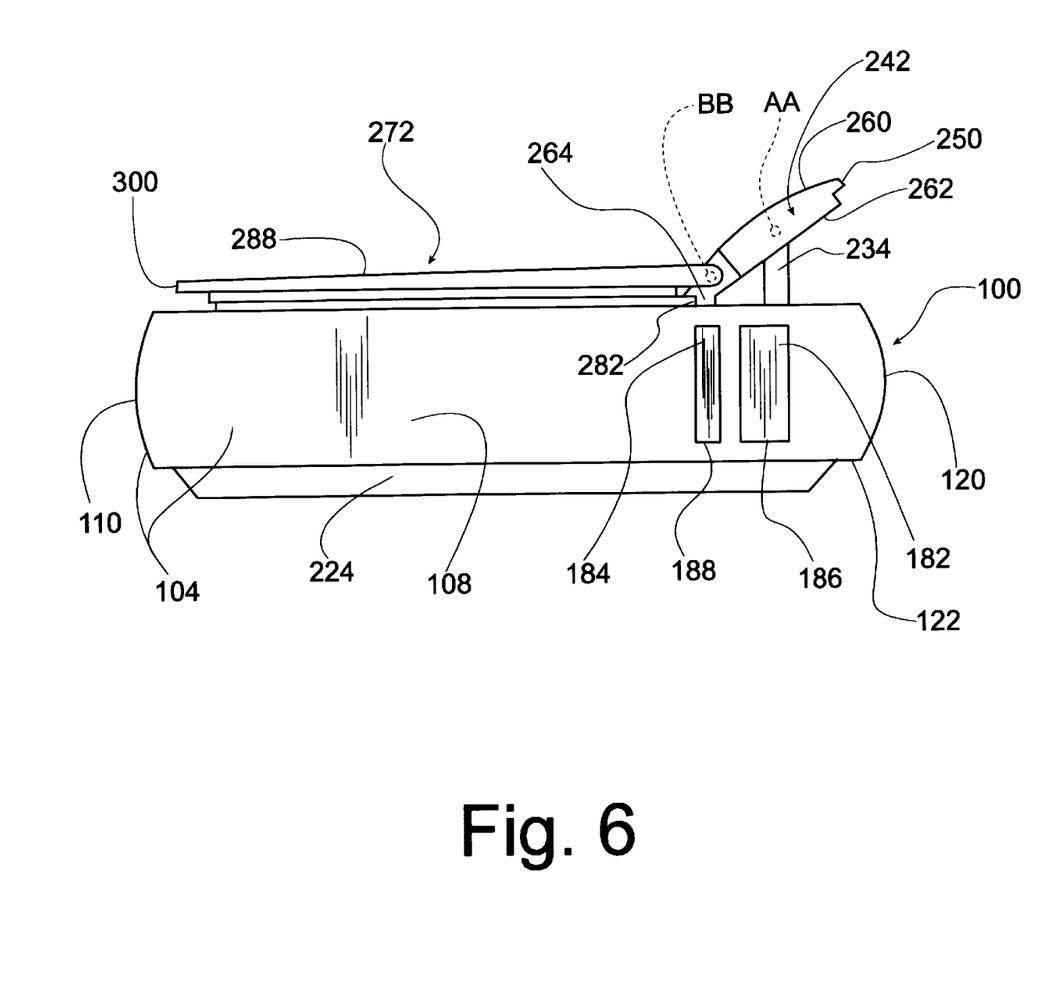
FIG. 6 is a side elevation view of an imaging device.

Referring to FIG. 6, a first control button 182 and a second control button 184 located on the peripheral sidewall 104 may be provided to control the imaging device 100. In the exemplary embodiment, a first button hole 186 and a second button hole 188 are provided on the housing right side portion 108. The first control button 182 may be provided in the first button hole 186. The second control button 184 may be provided in the second button hole 188. In the exemplary embodiment, the control buttons 182, 184 are positioned so as to be flush with the right side portion 108. In the exemplary embodiment, the first control button 182 is used for initiating the scanning operation, while the second control button 184 is used for turning the device on or off. It is to be understood that the control buttons 182, 184 could be used for other operations such as controlling the contrast, color adjustment, infrared communication initiation, image rotation, etc. Additionally, more or less control buttons 182, 184 could be used.

Figure 4:
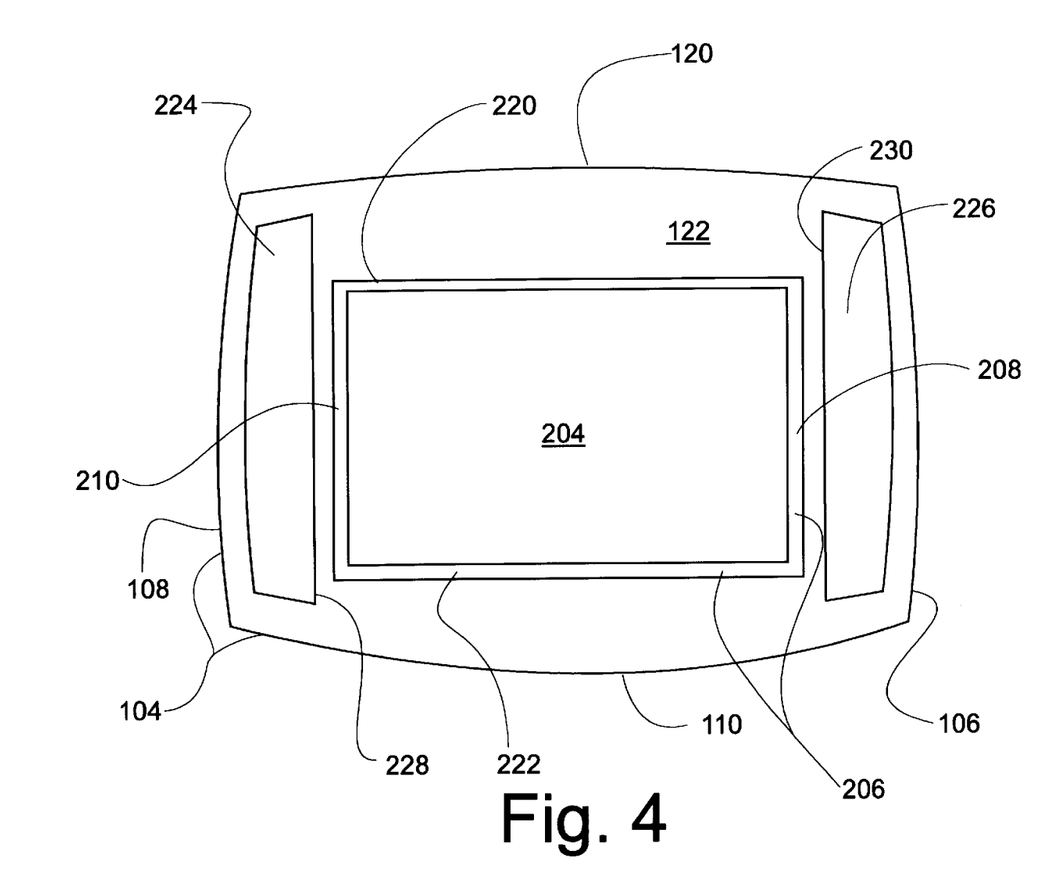
FIG. 4 is a bottom plan view of an imaging device.
Figure 5:
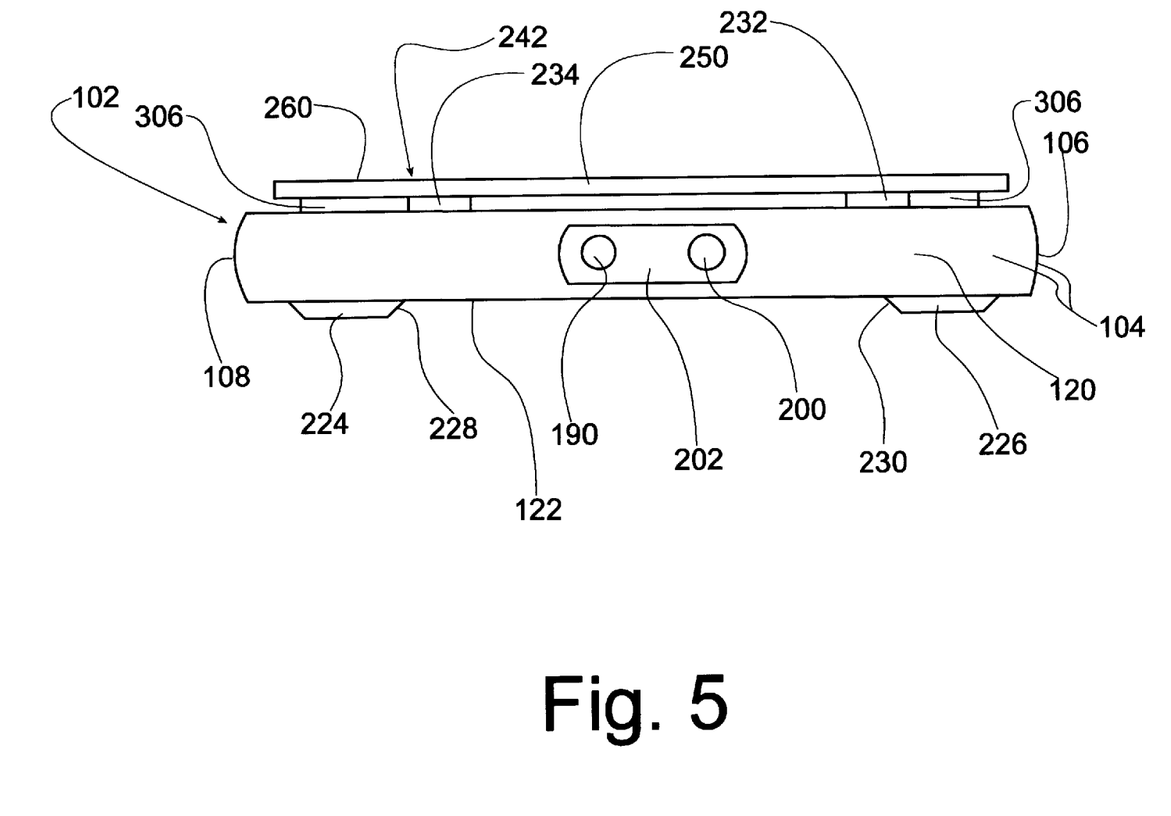
FIG. 5 is a back view of an imaging device.

Referring to FIG. 5, various connectors may be provided such as a data output port 190 and an electrical power port 200. In the exemplary embodiment, these ports 190, 200 are located in a junction area 202 on the housing back wall portion 120. Referring now to FIG. 4, the imaging device 100 may be provided with a scanned media "window" 204 having a perimeter 206 on the housing bottom portion 122. The scanned media "window" 204 may assist with positioning of the transparent media support platen 130 when the imaging device is used in an inverted orientation. Although the scanned media "window" 204 may be transparent in the illustrations, in the exemplary embodiment it is opaque. The perimeter 206 of the scanned media window 204 may be defined by a left side portion 208, a right side portion 210, a back portion 220, and a front portion 222 and may have the same or similar dimensions to those of the transparent media support platen perimeter 132. The scanned media window 204 may be disposed so that the perimeters 206, 132 of the scanned media window 204 and the transparent media support platen 130, respectively, are aligned. The scanned media window 204 may be defined by a protrusion, a recess, a color change or other indicia in the housing bottom portion 122. In the exemplary embodiment, the scanned media window 204 is a recess created during the injection molding of the bottom portion 122 of the housing 102.

Referring still to FIG. 4, the imagining device 100 may also be provided with a right bottom pad 224 and a left bottom pad 226 located on the housing bottom portion 122 of the imaging device 100. The bottom pads 224, 226 may be made from a relatively soft material, such as rubber or urethane to facilitate gripping by hand or gripping of a support surface. The left bottom pad 226 may be provided with a left edge 230 and the right bottom pad 224 may be provided with a right edge 228. These pads 224 and 226 may be attached to the housing bottom portion 122 by a number of conventional manufacturing technologies including: bi-injection, adhesive mounting, mechanical fasteners, molded interlocks, etc.

Figure 9:
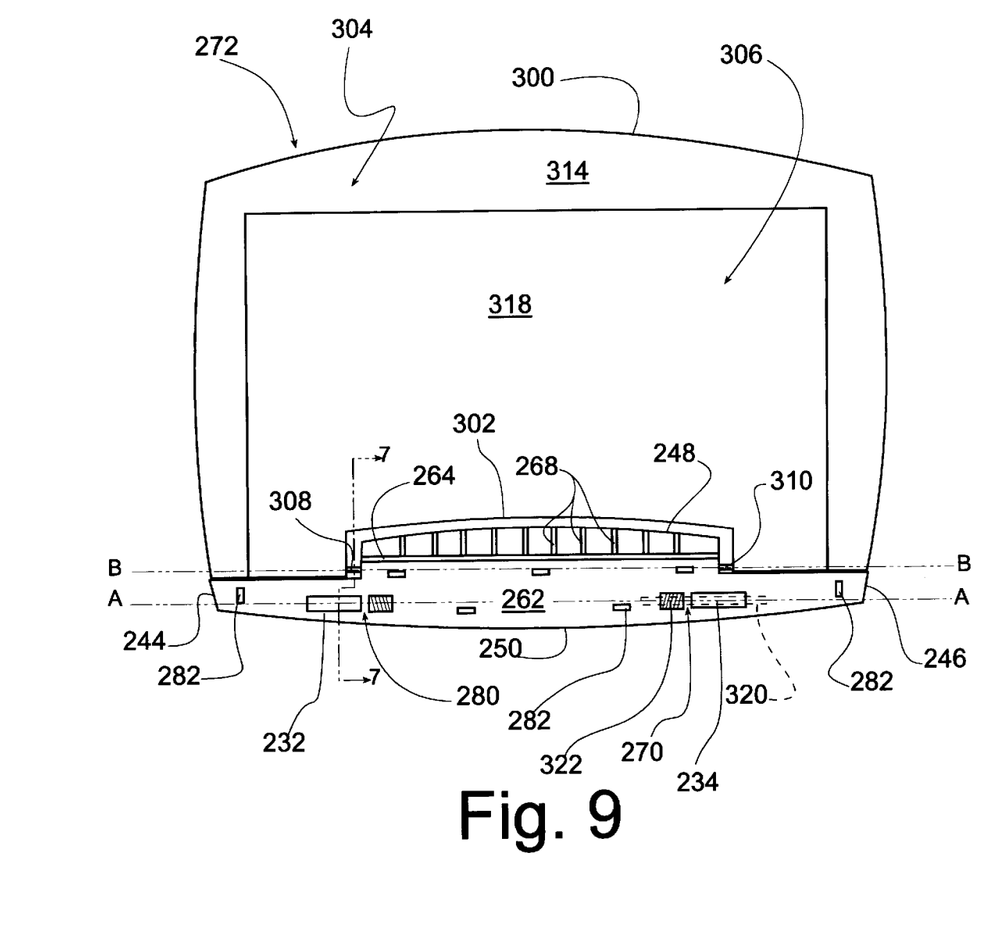
FIG. 9 is a bottom view of a media clamp and lid assembly of an imaging device.

A media clamp 242 has a left side portion 244, a right side portion 246, a front portion 248, a back portion 250, a top portion 260 and a bottom portion 262. The media clamp 242 may be provided with a left attachment post 232 and a right attachment post 234, FIGS. 6 and 7. Referring now to FIG. 9, located on the bottom portion 262 of the media clamp 242 may be a registration projection or edge 264. The registration edge 264 may have a height dimension of "a", FIG. 7, that may be approximately the same as the thickness of a photographic print or slightly less. The dimension "a" is considered to be a design alternative and may be a variety of thicknesses; additionally, the registration edge 264 may be removed if so desired. In the exemplary embodiment, the registration edge 264 extends parallel to an axis AA (FIG. 2) passing through the left and right attachment posts 232, 234. The area located between the registration edge 264 and the front portion 248 of the media clamp 242 preferably has several webs or clamp ribs 268 (FIG. 9). In the exemplary embodiment ten individual clamp ribs 268 are utilized. The ten clamp ribs 268 are considered a design alternative and it is to be understood that more or fewer clamp ribs 268 may be utilized.

The media clamp 242 may be a "clamshell" enclosure wherein a left clamp hinge assembly 270 and right clamp hinge assembly 280 are captured by the top portion 260 (FIG. 7) and the bottom portion 262. The seam of the enclosure is not shown in the drawings for illustrative purposes. The top portion 260 and bottom portion 262 may be held together by a number of conventional methods such as screws, rivets, adhesives, ultrasonic welding, or the like. In the exemplary embodiment, snaps 282, FIG. 9, acting as cantilevered latches deflect and snap closed with the assembly of the top portion 260 and the bottom portion 262 (FIG. 7).

Figure 8:
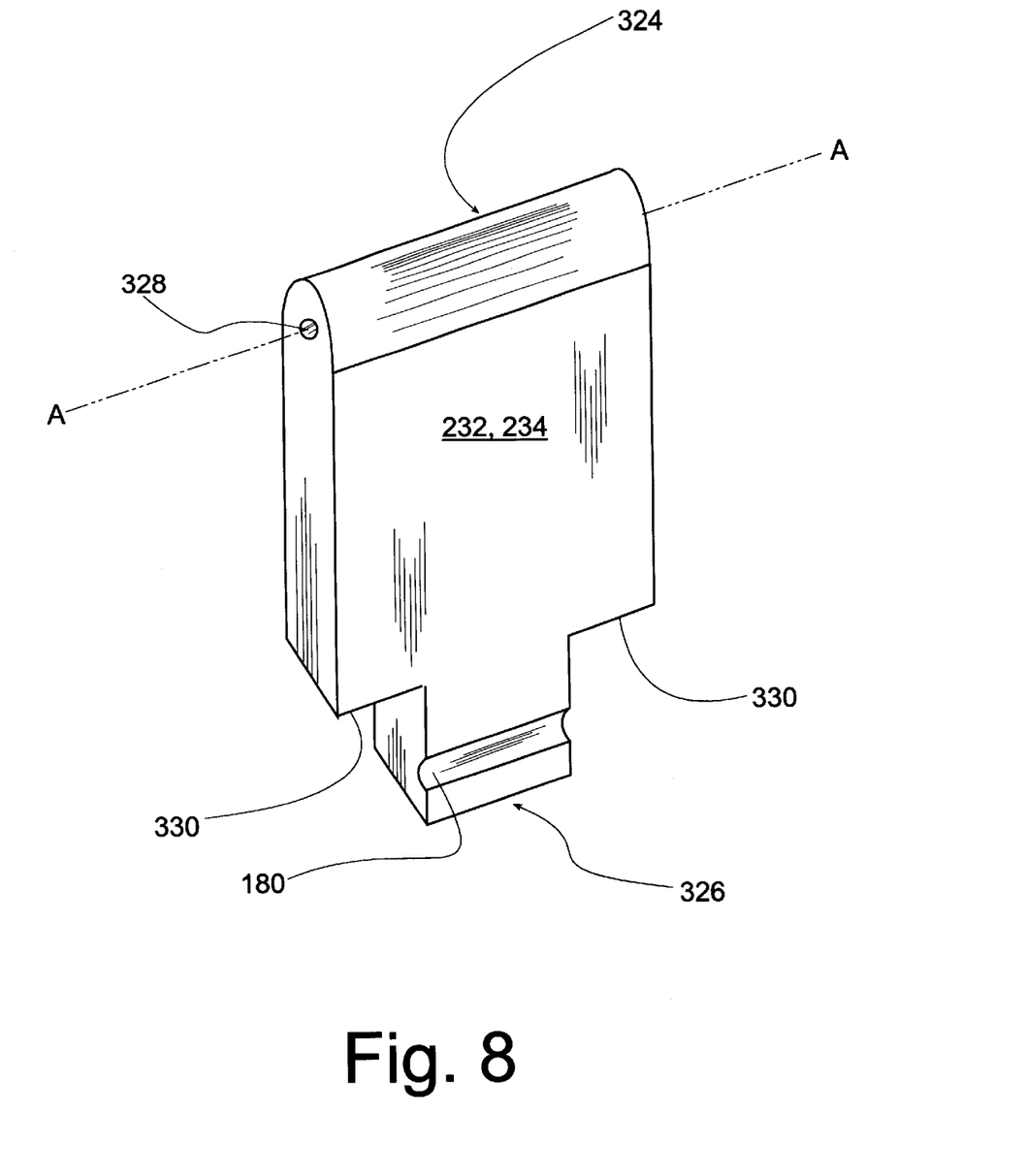
FIG. 8 is a perspective view of an attachment post.

The right clamp hinge assembly 270 (which may be essentially the same as the left clamp hinge assembly 280) may be provided with the right attachment post 234 (FIG. 8) a clamp hinge pin 320 (FIG. 9) and a clamp spring 322. Referring to FIG. 8, the right attachment post 234 may have a top end portion 324 and a bottom end portion 326. The top end portion 324 may be provided with a hole 328 for receiving the clamp hinge pin 320 and the clamp spring 322 may be positioned on the clamp hinge pin 320. The hole 328, the clamp hinge pin 320, and the clamp spring 322 may be disposed so that the resulting axis of rotation of the attachment posts 232, 234 may be on line AA. The bottom end portion 326 of the attachment post 234 may be provided with the detent 180. Located between the top and bottom end portions 324, 326 may be a height registration shoulder 330. In an exemplary embodiment, the right and left clamp hinge assemblies 270, 280 may be sub-assembled and captured by the "clam-shell" enclosure of the top and bottom portions 260, 262 of the media clamp 242. The font portion 248 of the media clamp 242 may be adapted for pivotally receiving a lid 272. The lid 272 may pivot about an axis defined by line BB as described herein.

Referring to FIG. 1, the lid 272 may have a top portion 288, a bottom portion 290, a front portion 300, and a back portion 302 (FIG. 2) and may be pivotally attached to the media clamp 242 on an axis of line BB. A left lid attachment pin 308 (FIG. 9) and a right lid attachment pin 310 may be received in axially aligned bores in the media clamp 242 and lid 272 to pivotally attach the lid 272 to the media clamp 242. The lid 272 may be provided with a semi-resilient flat member 304 and may have a soft conforming pad 306. The resilient planar member 304 may have a top surface 312 and a bottom surface 314 as shown schematically in FIG. 10. The soft conforming pad 306 may have a top surface 316 and a bottom surface 318. The top surface 316 of the soft conforming pad 306 may be disposed on the bottom surface 314 of the flat member 304. The bottom portion 290 (FIG. 7) of the lid 272 may be essentially covered by the soft conforming pad 306. The soft conforming pad 306 may be a solid color to allow for an accurate color calibration and may block light from external light sources.

Figure 10:
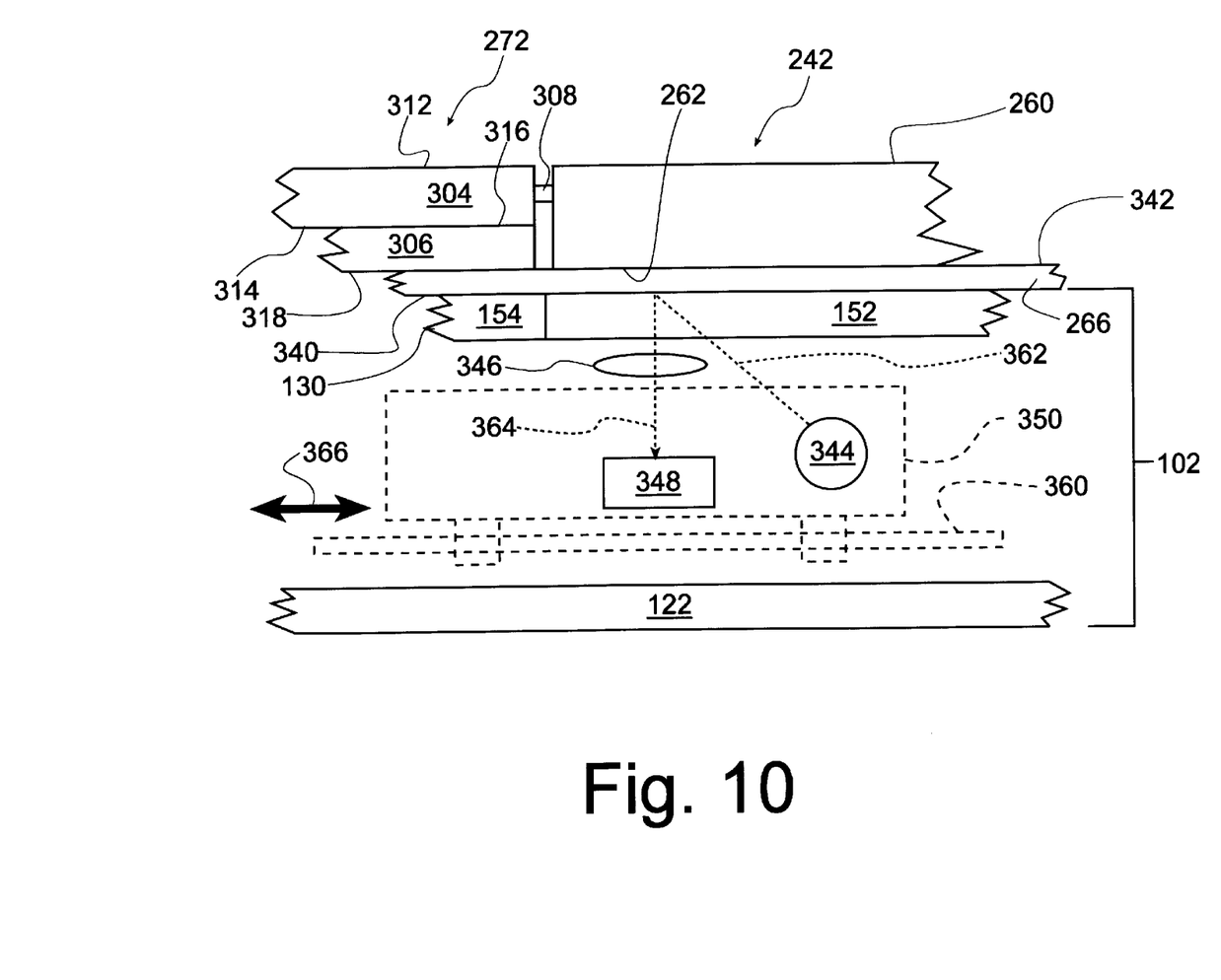
FIG. 10 is a partial, schematic, cross-sectional elevation view of an imaging device.

FIG. 10 is a cross-sectioned, partially broken away schematic of the imaging device 100 of FIG. 1 provided with a sheet of media 266. The sheet of media 266 may be provided with a front face 340 and a back face 342 positioned with a front face 340 on the transparent media support platen 130. The media 266 may have printing or graphics on the front face 340. The back face 342 of the media 266 may engage the bottom portion 262 of the media clamp 242 urging the media front face 340 against the first surface area 152 of the transparent media support platen 130. The portion of the media 266 overlying the platen region 154 is sandwiched between the platen 130 and the lid soft conforming pad bottom surface 318.

The imaging device 100 may have conventional scanner optical and electrical components including an illumination source or lamp 344, an imaging lens 346, and an optical sensor 348 such as a charge coupled device (CCD). The lamp 344, imaging lens 346 and optical sensor 348 may be mounted in a displaceable carriage 350 mounted on guide rails 360 extending parallel to platen edges 144, 146 or alternatively 140, 142. Light rays 362 from a lamp 344 reflect off the front face 340 of the media 266 as reflected rays 364. The reflected light rays 364 pass through the imaging lens 346 that focuses an image of an associated scan line portion of front face 340 of the media 266 on the optical sensor 348. The optical sensor 348 and its associated circuits generate electronic data representative of the scan line portion of the document that is imaged thereon as is well known in the art. FIG. 10 is simplified in that imaging devices typically include mirrors and other optical components well known in the art. In operation the imaging device 100 may be actuated by pushing the control button 182 (FIG. 6), causing the lamp 344 to light and a scanner motor (not shown) to move the carriage 350 in direction 366 below the transparent media support platen 130 from one end thereof to the other as is well known in the art. Various other scanning assemblies and imaging assemblies could be used.

Having described the detailed physical elements of an exemplary imaging device, operation of the device will now be discussed in detail.

Use of the imaging device 100 having the media clamp 242 may begin by pivoting the lid 272 about line BB to expose the transparent media surface 130, FIG. 1. With the transparent media support platen 130 exposed, the front face 340 of the media 266 may be placed facedown on the first and second surface areas 152, 154, FIG. 3. The user then pushes downwardly on the top portion 260 of the media clamp 242 near the back portion 250, thereby overcoming the torsional biasing force of the clamp spring 322. With the force of the clamp spring 322 overcome, the media clamp 242 may pivot on the clamp hinge pin 320 about the line AA. As a result, the front portion 248 of the media clamp moves away from the first area 152 of the transparent media support surface 130 that it was covering. The media 266 may now be positioned under the bottom portion 262 of the media clamp 242. Positioning the media 266 may be assisted by the registration edge 264 whereby an edge portion 282 of the media 266, FIG. 7, may come into contact with the registration edge 264 to align the media 266. By releasing the media clamp 242, the force of the clamp spring 322 causes the media 266 to be urged against the transparent media support platen 130. The spring 322 is preferably sufficiently strong to hold the media 266 in place on the transparent media support platen 130 even if the imaging device 100 is picked up and held with the platen 130 in a vertical orientation.

The next step in using the imaging device 100 may be to close the lid 272. The bottom portion 318 of the soft conforming pad 306 may be urged against the back face 342 of the media 266 by the weight of the lid 286 in the second surface portion 154. The weight of the lid may help smooth any folds or creases in the media 266. Because the media 266 is firmly held in its location by the pressure exerted by the media clamp 242, the closing action of the lid 272 does not cause any reorienting of the media 266. Additionally, the imaging device 100 may be moved and reoriented without concern for the orientation of the media 266. To reiterate, the media clamp 242 holds the media 266 from being inadvertently reoriented by air movement caused by external sources such as air movement caused by closing the lid 272. Additional sources of reorientating forces that the media clamp 242 combats may include hand-held use, use on irregular or inclined surfaces, and scanning of oversized sheet media.

When using the imaging device 100 as a hand-held device, the bottom pads 224, 226 allow for simplified handling of the imaging device 100 during operation. The soft feel of the bottom pads 224, 226 improve the ergonomics of the device by providing flat inclined surfaces of the right edge 228 and the left edge 230 for accepting the operator's finger tips. These soft bottom pads 224, 226 also assist with inadvertent forces to keep the imaging device from "slipping" on a surface when used on irregular or inclined surfaces. However the device may be used without such pads 224, 226.

To scan oversized or immobile objects the media clamp 242 and lid 272 may be removed thereby rendering a flat, protrusion-free housing top portion 124 and transparent media support platen 130. Typical immobile media include a book attached to a viewing pedestal, a painting, an oversized print, a plaque, or the like. Referring to FIG. 7, removal of the media clamp 242 and lid 272 may be accomplished by urging the front end 248 of the media clamp 242 away from the imaging device 100 in a removal direction 261. When urging the media clamp 242, the protrusion 171 on the cantilevered latch 170 disengages from the detent 180 on the attachment post 232. Having disengaged the detent 164, the attachment post 326 may be readily removed from the receiving cavity 148 on the imaging device 100. It is a particular benefit that this removal may be accomplished without the use of tools. However, other detachable attachment assemblies well known in the art may be used with or without tools, e.g. wing nut attachment, hook and latch attachment, screw attachment, etc may be employed. Preferably the lid 272 and media clamp 242 are "readily removably attached." "Readily removably attached" as used herein means that attachment or detachment may be completed without tools in less than 10 seconds by an ordinary user.

Having removed the media clamp 242 and the lid 272, the flat, protrusion free housing top surface 124 may be placed against immobile media and aligned. In order to align the transparent media support platen 130 the scanned media "window" 204, FIG. 4, on the back side 122 of the scanner housing 102 may be aligned with the proper area to be scanned. To align the transparent media support platen 130, the user visually registers the scanned media window 204 in the desired location. The control button 182 may be depressed to initiate a scanning sequence. In the scanning sequence the light source 344 emits rays of light 362 as discussed previously. The photo sensor 348 collects reflected light and converts it to machine readable data. It is a particular advantage of the exemplary embodiment that the control buttons 182, 184 are located on the peripheral wall 104 to allow the scanning of immobile media or oversized objects. By mounting the control buttons 182, 184 in an accessible location when the imaging device 100 is operated up-side-down, the user may easily initiate a scanning operation to capture such media or immobile objects. To reinstall the media clamp 242 and lid 272 assembly, the attachment posts 232, 234 are aligned with the receiving cavities 148, 150. Pressure may be applied to the media clamp 242, thereby urging the attachment post 232 in an installation direction 263, FIG. 7, into the receiving cavity 148 to engage the cantilevered latch 162. The height of the attachment posts 232, 234 may be regulated by the position of the height registration shoulder 330. The height registration shoulder 330 (FIG. 8) interfaces with the housing top portion 124 thereby controlling the height of the line AA. In the exemplary embodiment, the pair of the attachment posts 232, 234 may make a temporary connection, however it is to be understood that the connection could be permanent. Also, the connection of the media clamp 242 and lid 272 could be made on the peripheral sidewall 104 of the scanner housing 102 instead of the housing top portion 124.

Figure 11:
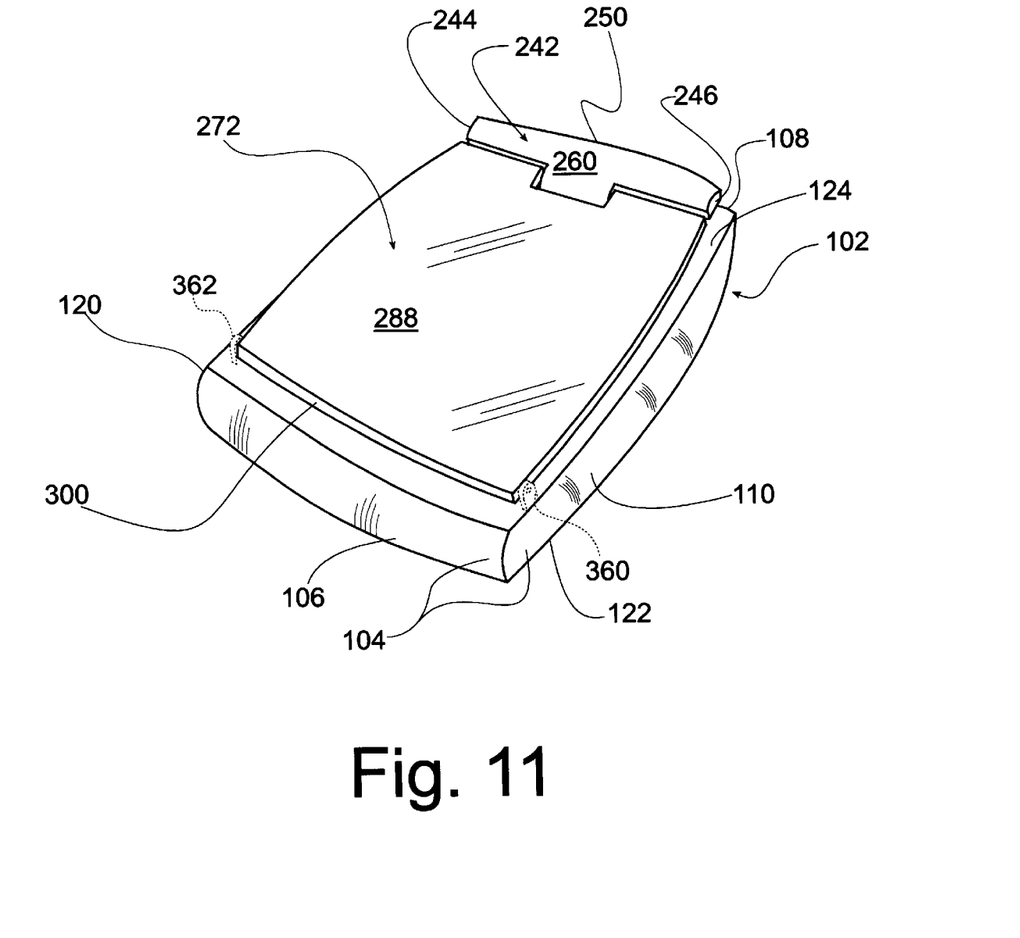
FIG. 11 is a perspective view of an imaging device in accordance with the present invention having an alternative embodiment.

The preceding exemplary embodiments may be altered in a variety of ways; for example more then one media clamp 242 may be incorporated for situations requiring multiple gripping points. Multiple gripping points may be required if multiple pieces of media 266 are to be scanned at once, or if the media 266 needs to be under tension. Additionally, the lid 272 may be attached to the scanner housing 102 at locations other than the media clamp 242. Referring to FIG. 11, the media clamp 242 may be mounted on the right side of the housing top portion 124 and the lid 272 may be pivotally mounted on the left side of the housing top portion 124. As shown in FIG. 11, the lid 272 may be pivotally mounted by a pair of hinges 360, 362. It is to be appreciated that the location and relationship between the lid 272 and the media clamp 242 may be varied. For example, the media clamp could be located anywhere on the housing top portion 124. Additionally, the lid 272 could be mounted to the media clamp 242 or could be mounted directly to the housing top portion 124. As shown in FIG. 11, the lid 272 could be mounted directly to the housing by the pair of hinges 360, 362 or could be pivotally attached to the media clamp 242. If required for a particular application, multiple lids 272 could be utilized. The invention could have alternate media alignment other than the registration edge 264; for example: the media 266 could be positioned against the attachment posts 232, 234, protrusions could exist on the housing top portion 124, or indicia could be located on the housing top portion 124. When using the imaging device, the user may interface the output port 190 of the imaging device 100 with a web enabled television. The user initiates a scanning operation to scan and distribute an image via the web. However, as previously mentioned, the clamp assembly may be used with any of the many flatbed imaging devices and is not limited to any particular device.

We claim:

1. An imaging device comprising:
    a transparent, media support platen comprising a first surface portion and a second surface portion;
    a media clamp mounted in displaceable, overlying relationship with said first surface portion of said platen; and
    a lid mounted in displaceable overlying relationship with said second surface portion of said platen.

2. The imaging device of claim 1 wherein said platen comprises a first edge portion and wherein said media clamp comprises a media registration portion positioned parallel to said platen first edge portion.

3. The imaging device of claim 1, said media clamp being biased toward said platen.

4. The imaging device of claim 1, said first surface portion of said support platen being smaller than said second surface portion of said support platen.

5. The imaging device of claim 4, said first surface portion comprising an area of less than ten square inches.

6. The imaging device of claim 1, said clamp being pivotally attached to said lid.

7. The imaging device of claim 6, said lid extending from said clamp to cover said second surface portion.

8. The imaging device of claim 1, said imaging device further comprising a housing supporting said platen, said clamp and said lid being readily removeably attached to said housing.

9. The imaging device of claim 8, at least one of said clamp and said lid being readily removeably attached to said housing by a detent assembly.

10. The imaging device of claim 8, said housing comprising a flat, unobstructed upper housing surface portion positioned in coplanar relationship with said first and second platen surface portions whereby, with said clamp and said lid removed, said scanning device comprises a flat, unobstructed top surface portion.

11. The imaging device of claim 1, wherein said platen comprises a cavity and wherein said media clamp is positioned in said cavity.

12. The imaging device of claim 11, wherein said cavity comprises a cantilevered latch having a protrusion.

13. A method of imaging at least one object comprising:

holding a first object against a platen with a clamp; and covering a portion of the platen not covered by the clamp with a lid.

14. The method of claim 13 comprising:

registering an edge portion of the object with an edge portion of the clamp.

15. The method of claim 13 comprising removing the clamp and the lid from a housing supporting the platen;

urging the platen against a second object.

16. An imaging device comprising:

transparent means for supporting an object to be imaged;

means for clamping said object to said transparent means and for partially light blockingly covering said transparent means; and means for light blockingly covering all portions of said transparent means not covered by said means for clamping.

17. The imaging device of claim 16 comprising:

means for mounting said means for clamping in pivotable and readily removeably relationship relative said transparent means.

18. The imaging device of claim 16 comprising:

means for pivotally mounting said means for clamping to said means for covering.

19. A method of imaging an object comprising:

biasingly urging a portion of said object against a first side of a platen;

illuminating said object from a second side of said platen opposite said first side.

* * * * *